March 18, 1930.  T. MATSUI  1,751,345
SPRINKLER
Filed Jan. 5, 1927  2 Sheets-Sheet 1
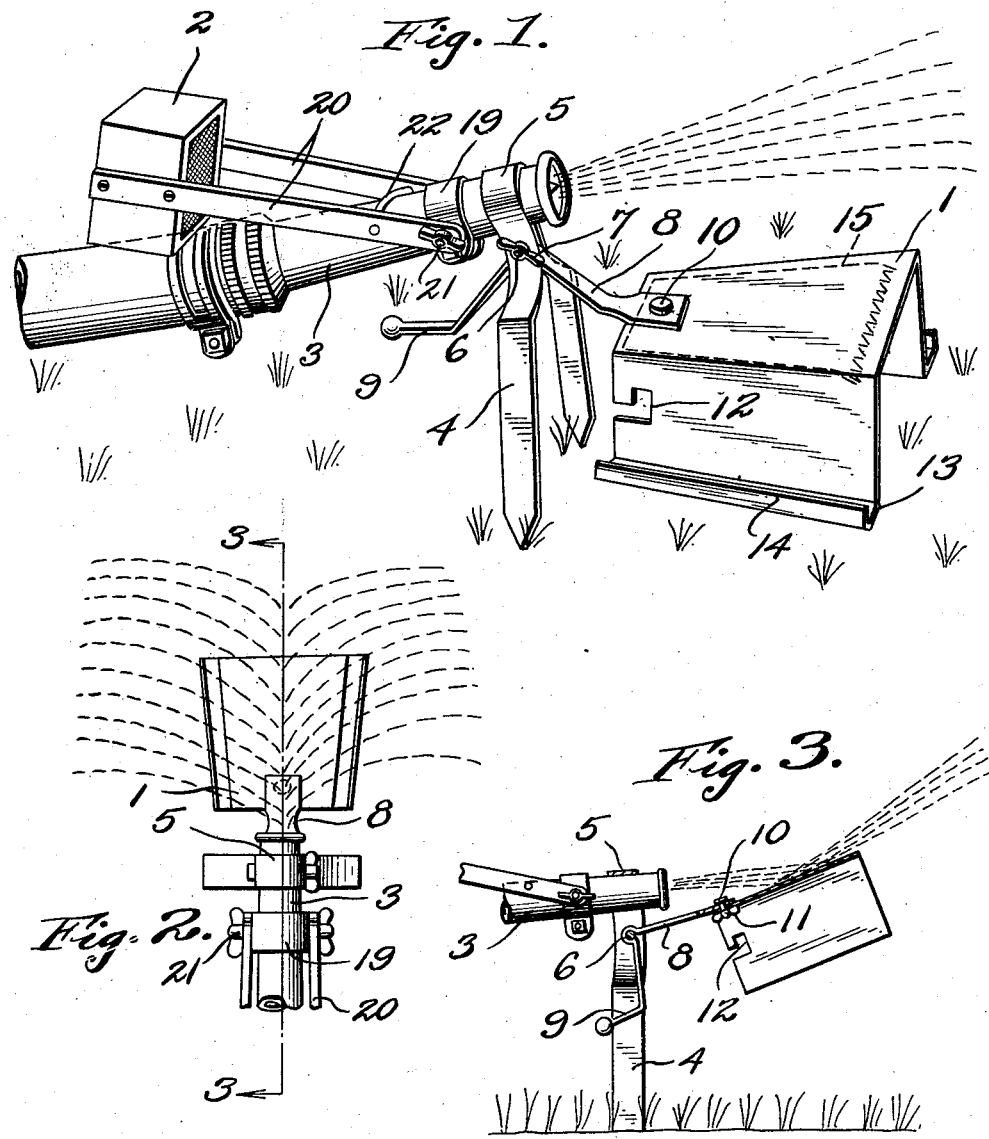

March 18, 1930. T. MATSUI 1,751,345
SPRINKLER
Filed Jan. 5, 1927   2 Sheets-Sheet 2
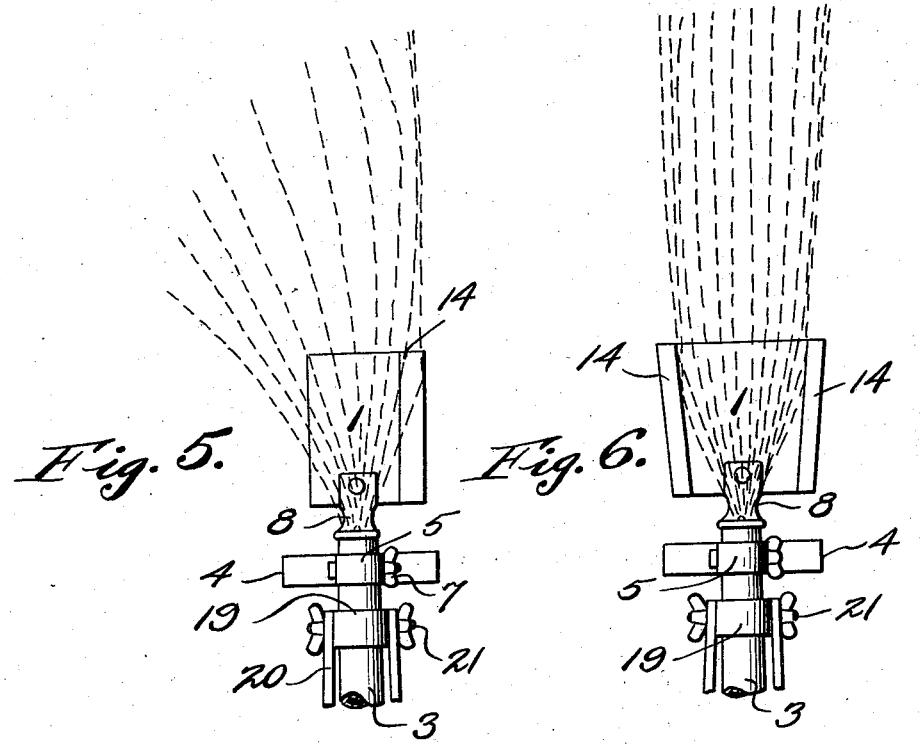
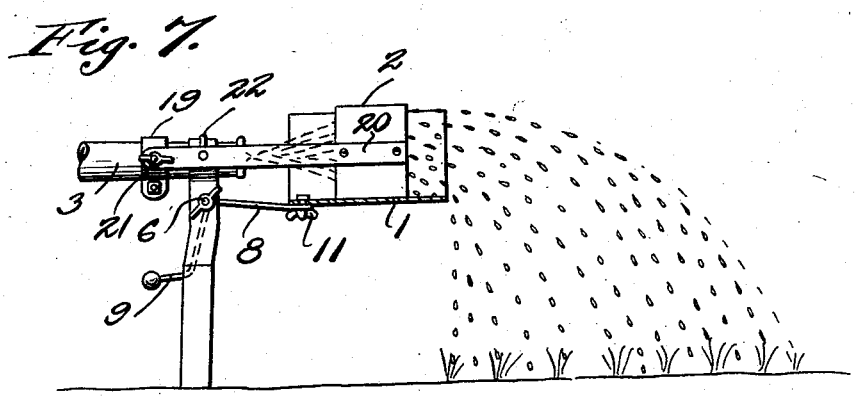
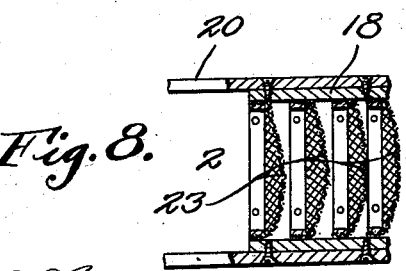
Tashiro Matsui
INVENTOR Patented Mar. 18, 1930

1,751,345

UNITED STATES PATENT OFFICE

TASHIRO MATSUI, OF TACOMA, WASHINGTON

SPRINKLER

Application filed January 5, 1927. Serial No. 159,207.

This invention relates to attachments for a nozzle of a hose, the general object of the invention being to provide means for controlling the flow of water from the nozzle in such a manner that it can be directed to various points by placing the device in different positions, the device also acting to turn a stream of water into a spray.

Another object of the invention is to provide a screen carrying member which, when brought in front of the nozzle, will divide the stream of water into a spray and will so check the momentum of the stream that the drops of water forming the spray will drop upon the ground a short distance from the device.

A further object of the invention is to provide means for preventing the spray from passing to one side of the device so that lawns can be watered close up to sidewalks, buildings and the like without wetting the sidewalk or building.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a perspective view showing the invention connected with the nozzle of a hose.

Figure 2 is a plan view of parts of Figure 1.

Figure 3 is a section on line 3—3 of Figure 2.

Figure 4 is a view of a toothed plate forming part of the invention.

Figure 5 is a plan view showing the channel shaped member positioned to direct the spray to the left.

Figure 6 is a plan view with the member turned upside down to direct the spray straight ahead.

Figure 7 is a side view with parts in section, showing the two parts of the invention in use.

Figure 8 is a sectional view through the screen carrying member.

As shown in these views, the invention comprises a channel shaped member 1 and a screen carrying member 2 which are attached to a nozzle 3 for controlling the flow of water from the nozzle, the nozzle being supported by the legs 4 which are formed with a spring loop 5 which frictionally engages the nozzle. A bolt 6 passes through the two parts of the loop under the nozzle and has a wing nut 7 thereon and this bolt forms a pivot for an arm 8 which has a handle 9 formed at its rear end so that the arm can be moved to various positions and then by tightening the nut, the arm will be held in its adjusted position. A bolt 10, having a wing nut 11 thereon, is carried by the outer end of the arm and each side of the channel shaped member is provided with a bayonet slot 12 for receiving the bolt so that the said channel shaped member 1 can be attached to the arm with either its top uppermost or either side uppermost or the device can be so connected with the arm that water will pass through the channel, as shown in Figure 6. Each side member is bent over to form the small channel 13 and the end of the bottom of the channel is turned up, as at 14, to direct the water inwardly.

A plate 15 is also provided with a beveled slot 16 so that it can be attached to the arm by the nut and the outer end of the plate is provided with teeth 17 which are turned upwardly to divide the stream of water striking the plate into spray and direct it upwardly. This plate can be used alone and when not in use, it can be placed in the channel member, as shown in dotted lines in Figure 1, or it can be used with the member.

The member 2 is composed of a casing 18 which is attached to a split ring 19 by the arms 20, each arm being connected to the ring by a bolt 21 provided with a wing nut so that the arms are pivotally connected with the ring. The ring is clamped to the nozzle, as shown. A curved bar 22 has its ends connected to the arms intermediate their ends so that the bar will rest upon the nozzle and hold the member 2 in front of the nozzle so that the stream of water from the nozzle must pass through the device. When this device is not in use, it is thrown back until the bar 22 engages the nozzle, as shown in Figure 1. A plurality of screens 23 are placed in the casing 18 so that the water must pass through all of the screens as it comes from the nozzle and thus the stream of water is broken up into a spray and the momentum of the water is checked so that the spray will come from the device with little pressure or force and will drop upon the ground a short distance from the device, as shown in Figure 7. This Figure shows the device 2 placed in the channel shaped member so that the said member acts to direct the spray upon the plants or grass a short distance in front of the channel shaped member. Of course, the device 2 could be used alone, if desired.

Figure 1 shows both devices in inoperative position but by moving the member 1 upwardly, the stream of water will be directed against the top of the member so that the stream will be broken up into a spray, as shown in Figures 2 and 3. This spray will be flattened out and will flow over the front and sides of the member and thus water a considerable area of ground. Where a lawn or the like is to be watered close to a sidewalk or building, the device 1 is turned with one of its sides uppermost so that the channel 13 will prevent the water passing from the free edge of the said side and thus the sidewalk or building will be kept dry. Figure 5 shows the parts in this position with the channel 13 preventing the water from flowing to the right hand side of the device. By turning the device over and bringing the other side uppermost, the left hand side of the device will be kept dry. Figure 6 shows the water striking the bottom of the channel member so that the sides of the channel member will direct the spray straight ahead and prevent the water from passing to the sides of the device. Figure 7 shows the two devices being used together, as before stated. The arrangement shown in Figure 7 can also be used to place water in the radiator of an automobile, as the force of the water will be checked so that it will pass into the radiator with but little force. This arrangement is also useful for watering plants where a spray with force is not desirable. When the plate 15, shown in Figure 4 is used, the water is directed upwardly in a fine spray so that it will fall backwardly upon grass or plants and thus moisten the same without injuring the plants.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. An attachment for a nozzle of a hose comprising a channel shaped member, means for supporting said nozzle and means for positioning said member with respect to the nozzle so that the water coming from the nozzle will strike either the inner or outer face of the bottom wall of said member, or the outer face of either side wall, each side wall having its free longitudinal edge bent outwardly into channel shape to prevent the water passing from the said edges of the side walls, a casing having a plurality of screens therein attached to the nozzle and adapted to be brought in front of the nozzle so that the water from the nozzle will pass through the screens, said casing resting in the channel shaped member when the said member is in a position with its channel part uppermost.

2. In combination with a nozzle of a hose, a leg carrying member clamped to the nozzle and supporting the same off the ground, an arm adjustably connected with the leg carrying member, a channel shaped member, means for detachably connecting the channel-shaped member to the arm, with the inner or outer face of its bottom or either side wall uppermost, said arm holding the member in a position whereby the water from the nozzle will strike that face or wall of the member which is uppermost.

3. A device of the character described consisting of a device adapted to be assembled with a hose, said device comprising a member having side and bottom walls, a common support for said hose and for said member, means for detachably connecting said member to the support with the inner or outer face of its bottom or either side wall uppermost, said support holding the member in a position whereby the water from the hose will strike that face or wall of the member which is uppermost.

4. A device of the character described consisting of a device adapted to be assembled with a hose, said device comprising a member having side and bottom walls, a common support for said hose and for said member, said member having the lateral edges of its side walls laterally rebent upon themselves to form additional channels, and means for detachably connecting said member to the support with the inner or outer face of its bottom or either side wall uppermost, said support holding the member in a position whereby the water from the hose will strike that face or wall of the member which is uppermost.

5. A device of the character described consisting of a device adapted to be assembled with a hose, said device comprising a member having side and bottom walls forming a channel, a common support for said hose and for said member, means for detachably connecting said member to the support with the inner or outer face of its bottom or either side wall uppermost, said support holding the member in a position whereby the water from the hose will strike that face or wall of the member which is uppermost, means attached to the hose and adapted to be positioned in the channel, said means having a screen therein which when so positioned will lie at right angles to the bottom of the member.

6. An attachment for a nozzle of a hose comprising a channel shaped member, means for supporting said nozzle and means for positioning said member with respect to the nozzle so that the water coming from the nozzle will strike either the inner or outer face of the bottom wall of said member, or the outer face of either side wall, each side wall having its free longitudinal edge bent outward into channel shape to prevent the water passing from the said edges of the side walls.

7. In combination with a nozzle of a hose, a leg carrying member clamped to the nozzle and supporting the same off the ground, an arm adjustably connected with the leg carrying member, a channel shaped member, means for detachably connecting the channel shaped member to the arm with the inner or outer face of its bottom or either side wall uppermost, a plate provided along one edge with teeth lying in a plane in angular relation to the plane of the plate and having adjacent its other edge means for connecting said plate with said arm, said plate being so dimensioned with respect to the channeled member as to enable it to lie on the bottom or either side wall thereof, said arm being adjustable to position the assembled channel member and plate in the path of the stream delivered from said nozzle.

In testimony whereof I affix my signature.

TASHIRO MATSUI.